(12) United States Patent
Gallerani

(10) Patent No.: US 12,296,271 B2
(45) Date of Patent: May 13, 2025

(54) GPS SEED FOR GAME PLAY

(71) Applicant: Activision Publishing, Inc., Santa Monica, CA (US)

(72) Inventor: Robert Louis Gallerani, Wynantskill, NY (US)

(73) Assignee: Activision Publishing, Inc., Santa Monica, CA (US)

( * ) Notice: Subject to any disclaimer, the term of this patent is extended or adjusted under 35 U.S.C. 154(b) by 101 days.

(21) Appl. No.: 17/810,808

(22) Filed: Jul. 5, 2022

(65) Prior Publication Data

US 2023/0158406 A1 May 25, 2023

Related U.S. Application Data

(63) Continuation of application No. 16/537,257, filed on Aug. 9, 2019, now abandoned.

(51) Int. Cl.
| | |
|---|---|
| *A63F 9/24* | (2006.01) |
| *A63F 13/00* | (2014.01) |
| *A63F 13/216* | (2014.01) |
| *A63F 13/65* | (2014.01) |
| *F41A 33/00* | (2006.01) |
| *G06F 17/00* | (2019.01) |

(52) U.S. Cl.
CPC ............ *A63F 13/65* (2014.09); *A63F 13/216* (2014.09); *A63F 2300/205* (2013.01); *A63F 2300/5573* (2013.01)

(58) Field of Classification Search
None
See application file for complete search history.

(56) References Cited

U.S. PATENT DOCUMENTS

| | | | |
|---|---|---|---|
| 2004/0157662 A1 | 8/2004 | Tsuchiya | |
| 2007/0190494 A1* | 8/2007 | Rosenberg | ............ A63F 13/79 463/40 |
| 2012/0214586 A1 | 8/2012 | Rowe et al. | |
| 2017/0259177 A1 | 9/2017 | Aghdaie et al. | |

OTHER PUBLICATIONS

Freiknecht, Jonas et al., A Survey on the Procedural Generation of Virtual Worlds, Multimodal Technologies and Interact, Oct. 30, 2017, 1, 27 pp. 1-34.
Togelius, Julian et al., Procedural Content Generation: Goals, Challenges and Actionable Steps,Artificial and Computational Intelligence in Games, Dagstuhl Follow-Ups, vol. 6, ISBN 978-3-939897-62-0, Dagstuhl Publishing, pp. 61-75.
Hartsook, Ken et al., Toward Supporting Stories with Procedurally Generated Game Worlds, 2011 IEEE Conference on Computational Intelligence and Games (CIG'11), Seoul, Korea (South), 2011, pp. 297-304, doi: 10.1109/CIG.2011.6032020.
U.S. Appl. No. 16/537,257, filed Aug. 9, 2019, Robert Louis Gallerani, US2021-0038991, Office Action Oct. 7, 2020 Final Office Action Jun. 2, 2021.

* cited by examiner

*Primary Examiner* — Lawrence S Galka
(74) *Attorney, Agent, or Firm* — RAY QUINNEY & NEBEKER P.C.; John O. Carpenter

(57) ABSTRACT

A seed number for use in generating aspects of a game world may be formed using GPS location information of a game device. The game device may include GPS circuitry for providing the GPS location information.

21 Claims, 9 Drawing Sheets

GPS SEED FOR GAME PLAY

CROSS-REFERENCE TO RELATED APPLICATION

This application is a continuation of U.S. patent application Ser. No. 16/537,257, filed Aug. 9, 2019, the disclosure of which is incorporated by reference herein.

BACKGROUND OF THE INVENTION

The present invention relates generally to generation of video game features, and more particularly to the use of location information in generating video game features.

Video games provide a source of entertainment for many. Video games often provide an interactive activity that can be interesting and challenging. For some video games, the interactive activity may be more interesting if the video game presents extensive details relating to a game world, either by way of presenting extensive details at any given time during game play or by way of providing an extensive number of different possible game play scenarios, or both. Similarly, the interactive activity may be more challenging if the video game presents a large number of variations in game play scenarios, again either by way of providing a large number of variations for any particular game play scenario or by way of providing a large number of game play scenarios, or both.

Having game developers specifying each of the extensive details of a game world, their occurrence, and their variations may be a laborious task. For a variety of video games, doing so simply may not be possible in a finite time by a finite number of game developers, or at least in a reasonable period of time by a reasonable number of developers.

Details of a game world may also be procedurally generated, for example based on a pseudo-randomly generated number used as a seed number for generating the details. Procedural generation of details of a game world may provide for an extensive number of variations in a game world as a whole, or for particular aspects of details relating to play of the video game. Unfortunately, the pseudo-randomly generated number may not always be sufficiently random in some cases. Conversely and perhaps more importantly, the use of the pseudo-randomly generated number may unduly constrain the ability of game developers to present content and provide for game play in a manner desired by the game developers.

BRIEF SUMMARY OF THE INVENTION

Some embodiments provide a method for use in determining aspects of a game world of a video game, comprising: receiving GPS location information generated by a game device including GPS related circuitry; forming a seed number based using at least some of the GPS location information; and generating aspects of the game world using the seed number.

Some embodiments provide a non-transitory computer readable memory storing program instructions, the program instructions comprising program instructions to configure at least one processor to: receive latitude and longitude values indicating location of a game device; operate on at least one of the latitude and longitude values to form a seed number; and use the seed number in generating aspects of a game world for video game play.

These and other aspects of the invention are more fully comprehended upon review of this disclosure.

DETAILED DESCRIPTION

Figure 1:
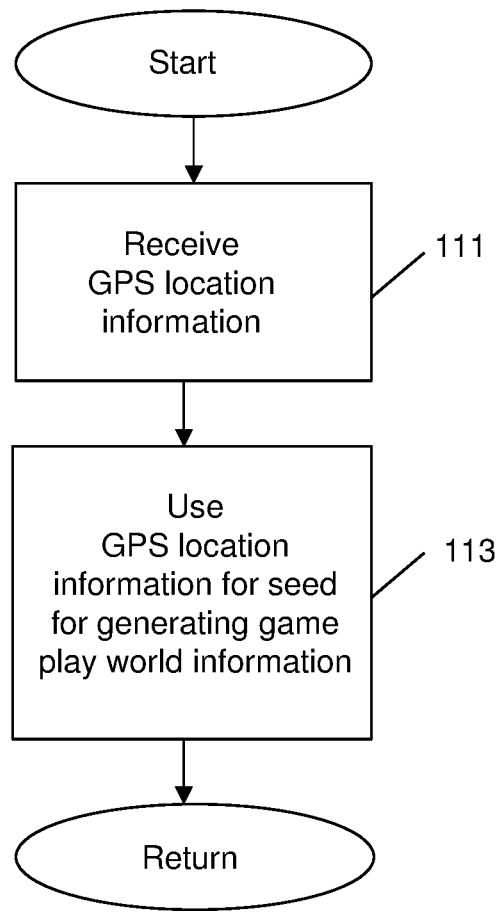
FIG. 1 is a flow diagram of a process for using GPS location information in obtaining a seed number for generating aspects of a game world for game play in accordance with aspects of the invention.

Aspects of a game world may be procedurally generated based on location information for a game player. In some embodiments GPS location information for a game player, for example GPS location information generated by a smart phone, may be used as a seed number in procedurally generating aspects of a game world for game play. For example, in some embodiments a puzzle may be procedurally generated using a seed number based on the GPS location information. In various embodiments a game level may be so generated, or characteristics or actions of a non-player controlled game character may be determined, at least in part, using a seed number based on the GPS location information. In some embodiments the seed number includes digits of the GPS location information. In some embodiments the seed number does not provide information to identify a location indicated by the GPS location information. In some embodiments the seed number is used in generating aspects of game play that are not related to position in a game world or level in game play.

In some embodiments the seed number is based on a concatenation of digits of the GPS location information. For example, in some embodiments the digits of the latitude and longitude of the GPS location information are concatenated together to form digits of the seed number. In some embodiments the digits of absolute values of the latitude and longitude of the GPS location information are concatenated together to form digits of the seed number. In some embodiments the digits of the latitude and/or longitude are truncated. In some embodiments one or more of the most significant digits of the latitude and/or longitude are removed, in some embodiments one or more of the least significant digits of the latitude and/or longitude are removed, and in some embodiments both one or more of the most significant digits and one or more and of the least significant digits are removed from the latitude and/or longitude values.

In some embodiments some types of game play may only be available at or within a predetermined radius or predetermined range of a real world physical location. For example, game worlds or game puzzles and/or other types of game activity may only be available for play on a game device in response to the game device being at particular physical locations, for example as indicated by GPS processing circuitry of the game device. In some such embodiments other types of game play may be available without regard to location of the game device, while the some types of game play are only available when the game device is at one of particular physical locations. In other embodiments, game play may only be available when the game device is at one of the particular physical locations.

In some embodiments GPS location information of a game device is used to determine if a type of game play is available for play, and to provide a seed number for generating aspects of a game world or level for the game play. In some embodiments the generated aspects of the game world or level are aspects other than location based aspects of the game world or level.

FIG. 1 is a flow diagram of a process for using GPS location information in obtaining a seed number for generating aspects of a game world for game play in accordance with aspects of the invention. In some embodiments the process is performed by a game device. In some embodiments the game device is a smart phone. In some embodiments the process, or parts of the process, is performed by a processor, for example a processor executing program instructions. The program instructions may be stored in non-transitory computer readable media available to the processor. In some embodiments the process is performed by a system, for example the system of FIG. 2. In some embodiments the process is performed by a part or parts of a system, for example a part or parts of the system of FIG. 2.

In block 111 the process receives GPS location information. In some embodiments the GPS location information is determined by a game device with GPS receiver circuitry. The game device may be, for example, a smartphone. In some embodiments the GPS location information is in the form of decimal degrees latitude and longitude information. For ease of discussion, examples herein will be in terms of decimal degrees, but the GPS location information may be in other formats in various embodiments. For example, the GPS location information may instead be in terms of degrees and decimal minutes, or some other format.

In block 113 the process uses the GPS location information to form a seed number for generating aspects of a game world for game play. In some embodiments the process concatenates digits of the GPS location information to form the seed number. In some embodiments the process forms the seed number as an integer. In some embodiments the process forms the seed number as a real number. In some embodiments the process normalizes the seed number to be a number in a predetermined range of numbers. In some embodiments the process performs a predefined operation using the GPS location information.

In some embodiments the process uses only selected digits of the GPS location information to form the seed number. For example, in some embodiments the process may truncate the latitude and longitude information, for example only using four digits after a decimal point of the latitude and longitude values. In some embodiments the process may, in addition or instead, remove one or some of the most significant digits of the latitude and longitude values. In some embodiments the process may utilize only predetermined digits of the latitude and/or longitude values in generating the seed number. In some embodiments the process may perform operations on some of the predetermined digits of the latitude and/or longitude values in generating the seed number.

In some embodiments the process may only use the seed number in generating only some aspects of the game world. For example, in some embodiments a non-player controlled game character may have or be equipped with particular equipment, with the equipment dependent on a value of the seed number.

Figure 2:
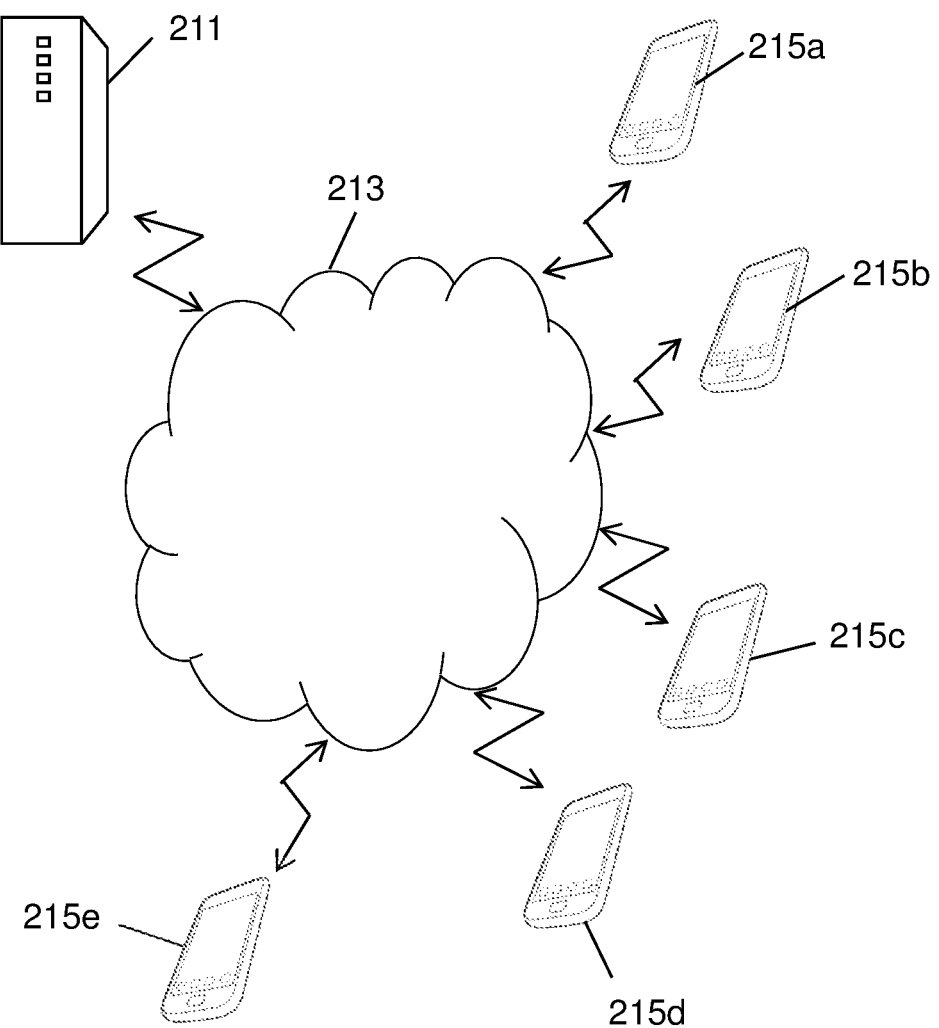
FIG. 2 is a semi-block diagram of a system in accordance with aspects of the invention.

FIG. 2 is a semi-block diagram of a system in accordance with aspects of the invention. The system includes a plurality of game devices 215a-e coupled to a game server 211 over a network 213, which may be for example the Internet. The game devices, and the server, may be considered compute devices. In some embodiments the game server may be a plurality of servers. The game devices generally include at least one processor, memory available to the processor, user input device(s), a display, and GPS location determination circuitry. The game devices are configured for play of a video game.

The game devices 215a-e are shown as smartphones in FIG. 2. In various embodiments the game devices may be other devices, for example tablet computers with GPS capabilities, or other generally mobile devices. In various embodiments the game devices include communication capabilities, for example cellular and/or Wi-Fi communication capabilities, for example allowing for communication with the server 211. Although only a small number of game devices are shown in FIG. 2, in some embodiments the number of game devices may be much greater.

The game devices are configured for play of a video game, for example a single player and/or multi-player video game. During play of the video game, a game player utilizes the input devices of a game device to control actions of a game icon or a game character associated with the game player, or otherwise play a video game on the game device. In some embodiments the game character, responsive to commands provided by the input devices, is in and interacts with a virtual game world, including its objects and its other inhabitants, some of whom may be game characters controlled by other game players and some of whom may be non-player controlled game characters, for example controlled by the video game itself. In some embodiments the game devices are configured to provide information regarding whether game play is occurring, and/or status of game play, to the game server. In some embodiments, for example in multi-player video games, the game server may receive information regarding game play status from the game devices, with the game server distributing the game play status to the various game devices. In some embodiments the game server may instead receive requests for game character actions from the game devices, with the game server determining game play status and distributing information regarding game play status to the game devices.

At least some aspects of the virtual game world are generated using a seed number. The seed number is based on GPS location information provided by the game device, for example by GPS circuitry of the game device. In some embodiments the game device forms the seed number by performing operations using the GPS location information. In some embodiments the game device transmits the GPS location information to the server, with the server forming the seed number by performing operation using the GPS location information. In some embodiments the game device generates the at least some aspects of the virtual game world using the seed number. In some embodiments in which the game device generates the seed number, the game device transmits the seed number to the server, the server generates the at least some aspects of the virtual game world using the seed number, and the server transmits information of the at least some virtual aspects of the game world to the game device. In some embodiments in which the server generates the seed number, the server transmits the seed number to the game device, and the game device generates the at least some aspects of the virtual game world using the seed number. In other embodiment in which the server generates the seed number, the server generates the at least some aspects of the virtual game world using the seed number, and the server transmits information of the at least some virtual aspects of the game world to the game device.

Figure 3:
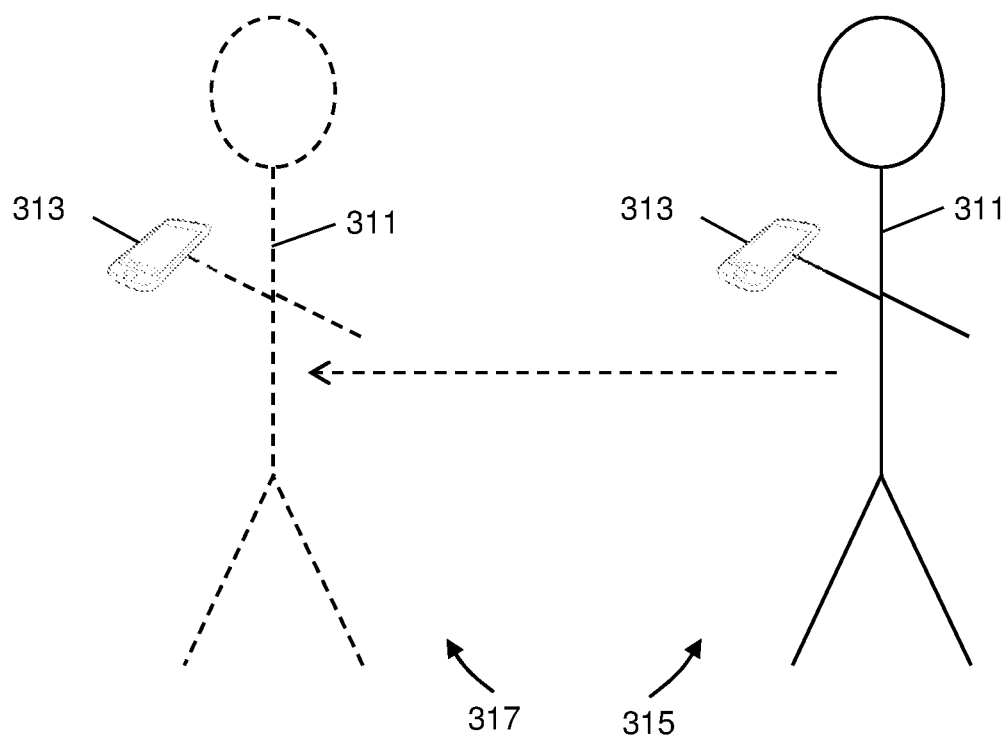
FIG. 3 illustrates an example of a changing position of a game player with a game device.

FIG. 3 illustrates an example of a changing position of a game player 311 with a game device 313. The changing of position potentially results in generation of different seed numbers in accordance with aspects of the invention. The game player is shown as holding the game device. The game device may be a smartphone in some embodiments, and as illustrated in FIG. 3. In various embodiments, however, the game device may be a tablet computer or other compute device. Generally the game device includes GPS receiver circuitry, with the game device generating GPS location information indicating location of the game device. The GPS location information may be in the form of latitude and longitude information. In some embodiments the latitude and longitude information is in the form of digital degrees, for example a latitude of 37.7651 and a longitude of −122.4650. In some embodiments the latitude and longitude information may include four digits after the decimal point, as in the immediately preceding example. In various embodiments, however, the latitude and longitude information may include more than four digits after the decimal point, depending on device implementation. For example, some devices may provide 6, 7 or more digits after the decimal point, even if the device may not be able to provide accurate location measurements to that degree of precision.

FIG. 3 shows the game player with the game device at a first location 315. With the game device at the first location, GPS related circuitry of the game device may provide first GPS location information. The first GPS location information may be in latitude and longitude digital degree format in most embodiments, although in various embodiments other formats may be used. In some embodiments the game device performs one or more operations using digits of the GPS location information to obtain a seed number for use in generating aspects of a game world. In some embodiments the game device may generate aspects of the game world using the seed number. In some embodiments the game device may forward the GPS location information to another device, for example a server, which may perform the operations to obtain the seed number. In some such embodiments the server may use the seed number in generating aspects of the game world, and provide information regarding the aspects of the game world to the game device. Alternatively, in some embodiments the game device may provide the seed number to the server, which may use the seed number to generate the aspects of the game world, and provide information regarding those aspect to the game device.

The game player may move, with the game device, to a second location 317. The second location may be, for example, due west of the first location, or at some other heading from the first location. At the second location, the GPS related circuitry of the game device may provide second GPS location information. The second GPS location information may be different than the first GPS location information, for example if the second location is sufficiently distant from the first location, a distance which may be for example a few meters to several meters, depending on device implementation details and other factors. In some embodiments the second GPS location information may be different than the first GPS information, even without sufficient distance between the two locations, simply because the device may report GPS location information at a precision much greater than the accuracy provided by the GPS related circuitry of the device. In various embodiments, however, the seed number may be generated without reference to digits of the GPS location information not expected to accurately reflect game device location.

In some embodiments the seed number, and the aspects of the game world based on the seed number, are regenerated upon change in the GPS location information. In some embodiments the seed number and corresponding game world aspects are regenerated only upon change in digits of the GPS location information used in generating the seed number. In some embodiments the seed number and game world aspects are only regenerated if the game device has also first left a predefined area about a game play location, or alternatively upon a request by the game player, for example as indicated by receipt of a user input indicating the request by the game device.

Figure 4:
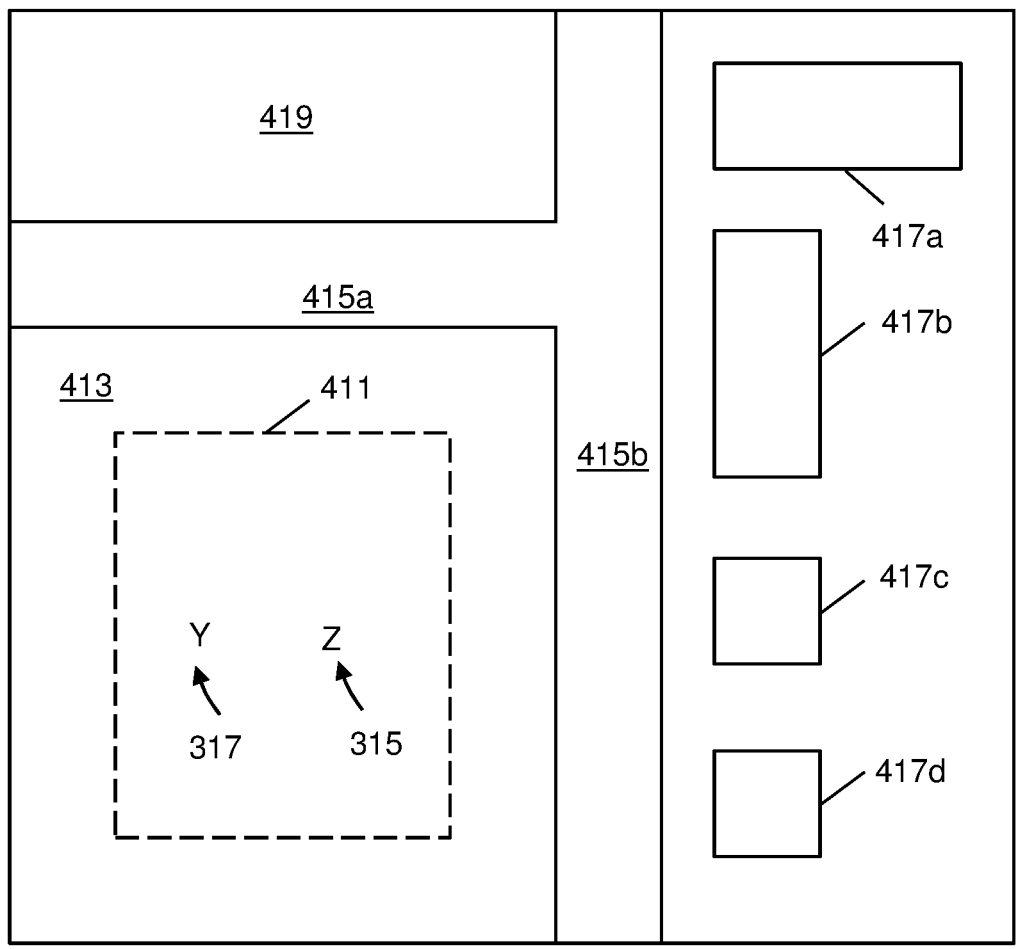
FIG. 4 provides an example of a map showing the first location and the second location of FIG. 2.

For context, FIG. 4 provides an example of a map showing the first location 315 and the second location 317 of FIG. 3. The first location and the second location may be in a play area 411 of a field 413. The field may be bounded on two adjacent sides by a first street 415a and a second street 415b. Another field 419 is across the first street, and a plurality of buildings 417a-d line an opposing side of the second street.

The first location 315 is located in the field. In some embodiments a game player may arrive at the first location and begin play of a video game on a game device of the game player. The game device may display views of a game world of the video game on a display of the game device, with a processor of the game device determining changes in video game states, and therefore the game world, in response to game device inputs operated by the game player. In some embodiments the game world may be in the form of a maze to be navigated by a game character or game icon controlled by the game player using the game device inputs. In some embodiments the game world may be a fantastical world in which a game character controlled by the game player interacts with objects and other game characters of the game world.

One or more aspects of the game world is generated using a seed number based on GPS location information determined by the game device at the first location. For example, in some embodiments layout of a maze may be generated using the seed number. Similarly, in some embodiments presence and locations of objects and/or non-player controlled game characters (and/or their abilities, equipment, and/or activities) in a fantastical game world may be determined using the seed number.

The second location 317 is also located in the field, with the second location being different than the first location. For purposes of description, the second location may be considered to be, for example, approximately 50 feet (approximately 15 meters) due west from the first location. The GPS location information provided by the game device for the second location would therefore be expected to be different than that for the first location. For example, for GPS location information in a digital degree format, the longitude values would exhibit a difference in at least the fourth digit past the decimal point. For embodiments in which the fourth digit past the decimal point of the longitude value is utilized in determining the seed number, the seed number would be different for the second location than the first location. The aspects of the game world generated using the seed number would therefore also be expected to differ between the first location and the second location.

In some embodiments game play is available at all locations. In some embodiments game play is only available at particular locations or within particular areas. For example, in some embodiments, in the area within the map of FIG. 4, game play may only be available while the game device is within the play area 411 of the field 413. Conversely, in some embodiments game play is not available at particular locations or within particular areas. For example, in some embodiments, in the area within the map of FIG. 4, game play may not be available while the game device is in the streets 415a and 415b, or within the buildings 417a-d.

Figure 5:
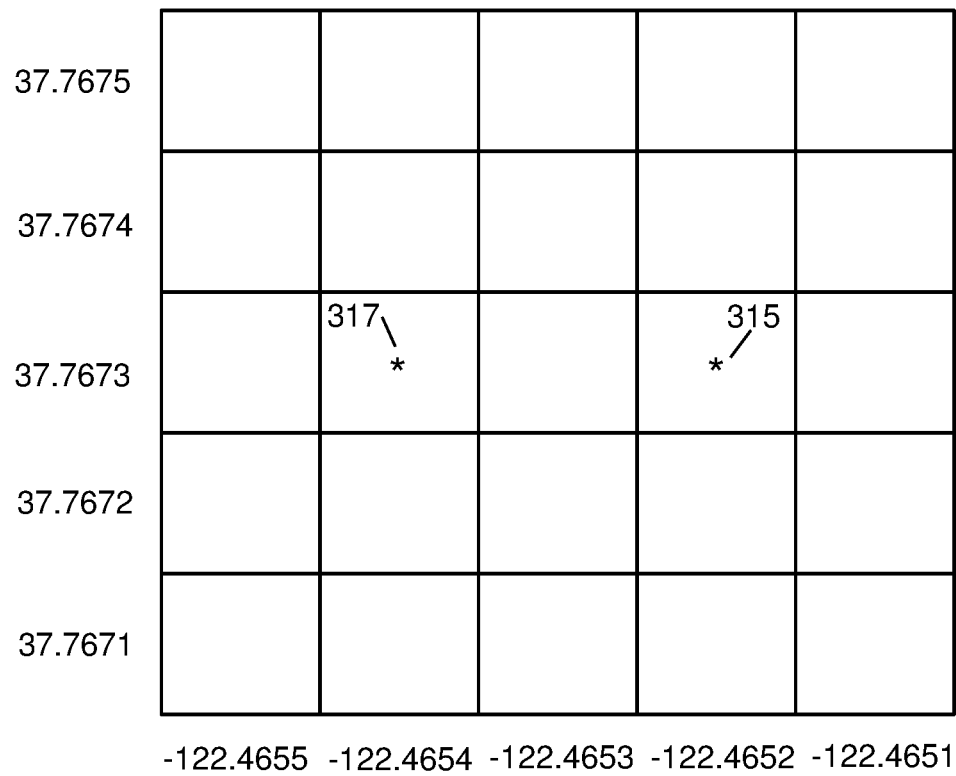
FIG. 5 is a further example map of the first location and the second location of FIG. 2.

FIG. 5 is an example map of the first location and the second location, with squares of the map indicting latitude and longitude position in decimal degrees. The map of FIG. 5 may encompass part of the area of the map of FIG. 4. The map shows latitude along a y-axis, with the latitude varying between 37.7671 degrees and 37.7675 degrees, in 0.0001 degree increments. The map shows longitude along an x-axis, with the longitude varying between −122.4655 and −122.4651 degrees, also in 0.0001 degree increments. In the map of FIG. 5, the first location 315 is shown as being at 37.7673 degrees latitude and −122.4652 degrees longitude. The second location 317 is similarly shown as being at 37.7673 degrees latitude and −122.4654 degrees longitude.

In some embodiments the latitude and longitude values may be operated on in determining a seed number. For example, the operations may include one, some, or all of addition, subtraction, multiplication, division, taking of absolute values, concatenation, normalization, and/or removal of particular digit(s). Other operations on the values may also be performed. For example, in one embodiment the seed number for the first location may be 377673124652, in another embodiment the seed number for the first location may be 76734652, and in yet another embodiment the seed number for the first location may be 0.16494 (i.e. five digits past the decimal point of 7673/4652/10). Similarly, for example, in the one embodiment the seed number for the second location may be 377673124654, in the another embodiment the seed number for the second location may be 76734654, and in the yet another embodiment the seed number for the second location may be 0.16486. In some embodiments, however, the seed number for both the first and second locations may be the same, with the first and second locations not sufficiently distant from one another to result in differences in generated seed numbers. In some further embodiments, however, the generated seed numbers may not be identical even if the first and second locations were at the same location, for example if GPS location information digits used are those reflecting information beyond the accuracy limits of the GPS circuitry.

In addition, in various embodiments a plurality of seed numbers may be generated for any particular location identified by latitude and longitude values, with for example different aspects of a game world being generated using different ones of the seed numbers. For example, for a fantastical virtual game world locations of various objects may be generated using a first seed number based on the GPS location information, while equipment of a non-player controlled game character may be determined using a second seed number based on the GPS location information. For example, in some embodiments a predetermined digit past the decimal point (e.g. the fourth digit past the decimal point) for the latitude information may provide a seed number for use in determining a number of objects in a virtual game world, while a predetermined digit past the decimal point (e.g. the fourth digit past the decimal point, or some other digit) for the longitude information may provide a seed number for use in determining equipment of a non-player controlled character in that game world.

Figure 6:
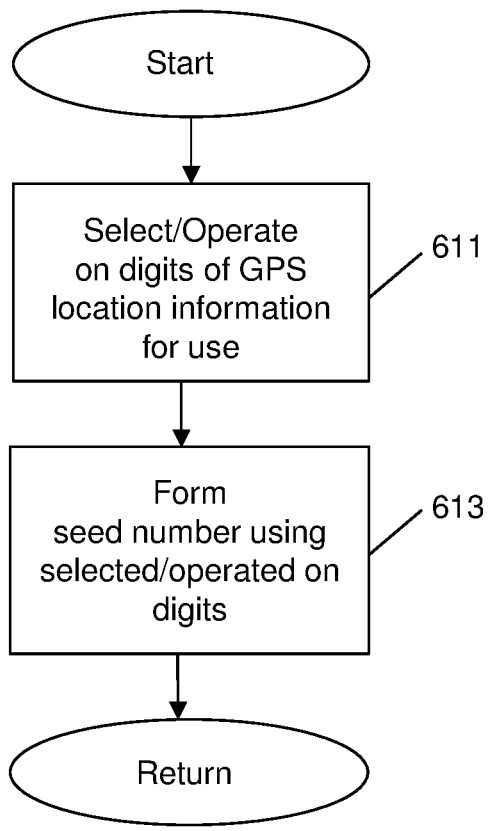
FIG. 6 is a flow diagram of a process for forming a seed number based on GPS location information in accordance with aspects of the invention.

FIG. 6 is a flow diagram of a process for forming a seed number based on GPS location information in accordance with aspects of the invention. In some embodiments the process is performed by a game device. In some embodiments the game device is a smart phone.

In some embodiments the process, or parts of the process, is performed by a processor, for example a processor executing program instructions. The program instructions may be stored in non-transitory computer readable media available to the processor. In some embodiments the process is performed by a system, for example the system of FIG. 2. In some embodiments the process is performed by a part or parts of a system, for example a part or parts of the system of FIG. 2.

In block 611 the process selects and/or performs operations on digits of GPS location information. In some embodiments the GPS location information is provided by the game device. In some embodiments the GPS location information is in terms of latitude and longitude. In some embodiments the GPS location information is in terms of decimal degrees latitude and longitude, but other formats may be used in various embodiments.

In some embodiments the process selects digits of the GPS location information to use, without performing further operations on the selected digits. In some embodiments the process performs operations on the GPS location information for use, without selecting only some of the digits for use. In some embodiments the process selects digits of the GPS location information to use, and performs operations on the selected digits. In some embodiments the process performs operation on the GPS location information, and selects digits of results of the operation. In some embodiments the operations include one, some, or all of addition, subtraction, multiplication, division, normalization, or some other operation.

In block 613 the process forms a seed number using the selected and/or operated on digits.

The process thereafter returns.

Figure 7:
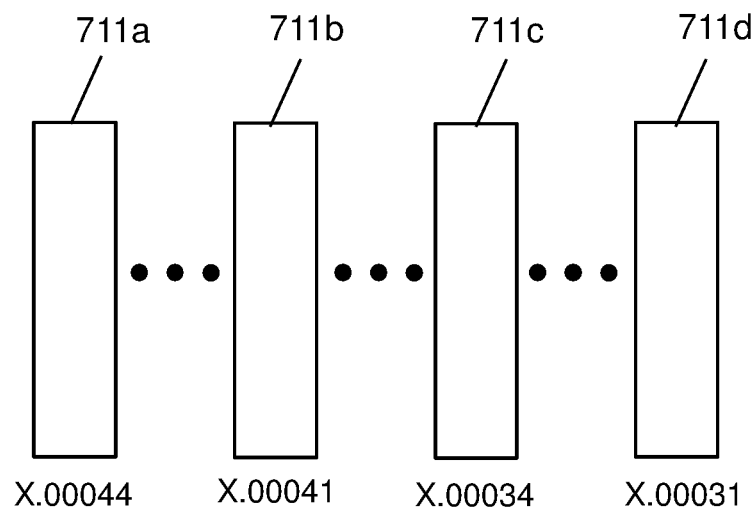
FIG. 7 shows 4 slices of longitude, for use in an example of a repetitive location based seed number, in accordance with aspects of the invention.

In some embodiments a seed number, and aspects of a game world generated using the seed number, may vary in a predictable manner with changes in location. For example, a seed number may be based on particular digits of the GPS location information, digits that repeat over distance. FIG. 6 shows changes in longitude values of GPS location information over distance, illustrating an example of repetition in at least one digit that may be used as a seed number for generating aspects of a game world. More particularly, FIG. 7 shows 4 slices of longitude. A first slice 711a is shown as a longitude of X.00044 decimal degrees, a second slice 711b is shown as a longitude of X.00041 decimal degrees, a third slice 711c is shown as a longitude of X.00034 decimal degrees, and a fourth slice 711d is shown as a longitude of X.00031 decimal degrees. As an example, the fifth digit after the decimal point may provide the seed number for use in generating an aspect of the game world. In such circumstances, with a game device at the longitude of the first or third slices, the seed number would be 4, and the aspect of the game world generated using the seed number 4 may be identical for both locations. Similarly, with the game device at the longitude of the second or third slices, the seed number would be 1, and the aspect of the game world generated using the seed number 1 may be identical for both of these locations, albeit possibly different than for locations in the first and third slices.

In the example of FIG. 7, therefore, the seed number may vary between 0 and 9 over a space of approximately 36 feet (approximately 11 meters). In such circumstances, a game player who is dissatisfied with the aspect of the game world generated using the seed number may change that aspect of the game world by changing location of the game device. Similarly, if the fourth digit after the decimal point were used, instead of the fifth, in the above example, the seed number may vary every 36 feet (11 meters) or so.

Figure 8:
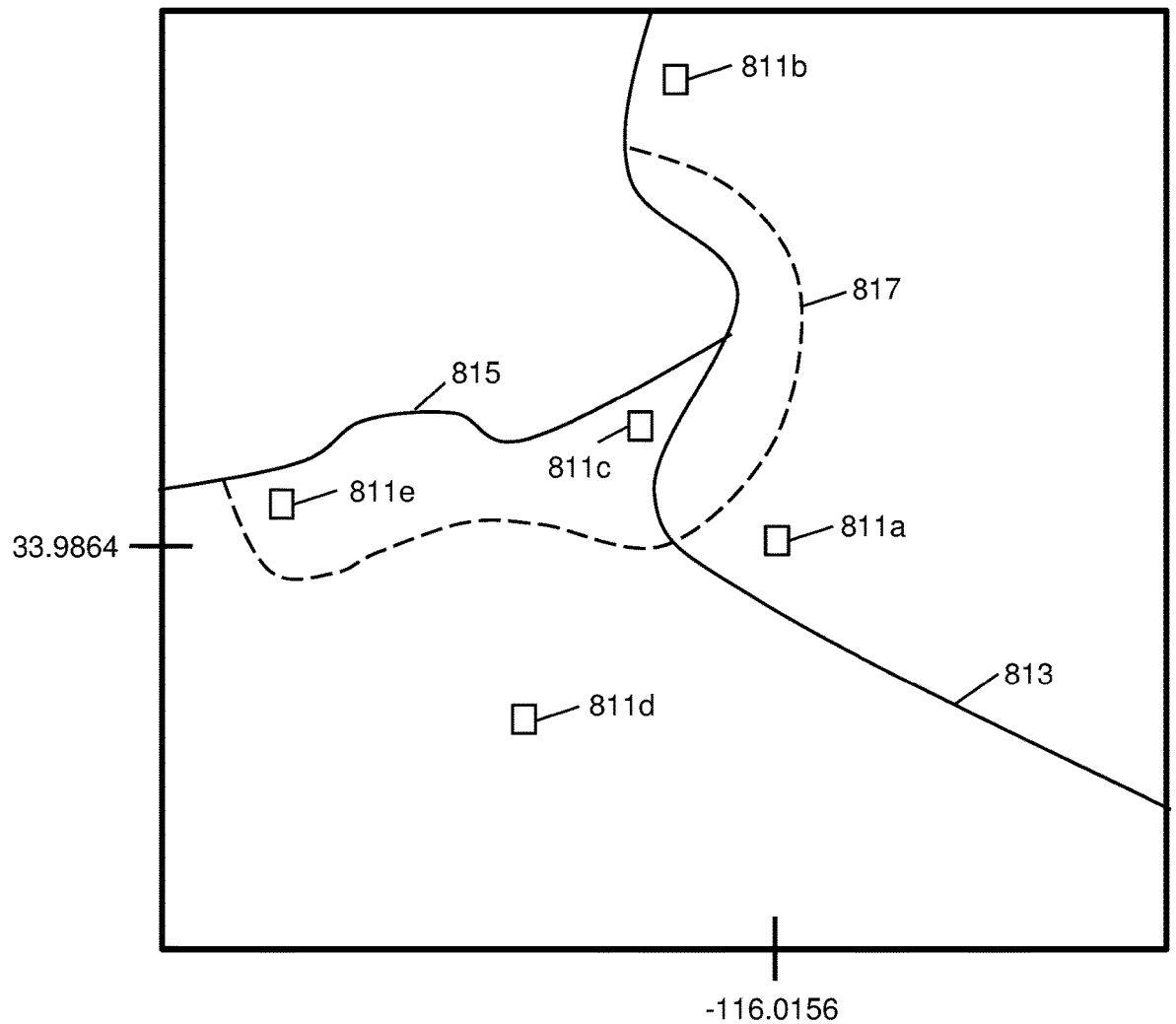
FIG. 8 is a map illustrating further aspects of the invention.

FIG. 8 is a map illustrating further aspects of the invention. The map includes a plurality of locations 811a-e at which game play of a video game is available. A first location 811a is near a middle of the map, with the first location east of an intersection of a generally north-southeast trending road 813 and a semi-looping trail 817. The map shows the first location at 33.9864 digital degrees latitude and −116.0156 digital degrees longitude. A second location 811b is near a top edge of the map, slightly east of the road 813 and north of an endpoint at the road of the trail 817. A third location 811c is slightly southwest of an intersection between the road 813 and a generally east-west road 815, which terminates at the road 813. A fourth location 811d is both south of the third location and south of a westward portion of the looping trail 817. A fifth location 811e is slightly southeast of an endpoint of the looping trail 817, which ends on the road 815.

In some embodiments video game play in the same general game world is available for each of the locations, with particular aspects of the game world being generated using a seed number based on GPS location information. As each of the locations 811a-e are different, and have different GPS location information, in many embodiments the particular aspects of the game world generated using the seed number may be different.

In some embodiments, however, video game play occurs in different virtual game worlds for each of the locations 811a-e. For example, game play may take place in a game world of a virtual castle with the game device at the first location 811a, a puzzle game may be played with the game device at the second location 811b, a forested virtual game world may be provided for game play with the game device at the third location 811c, and so on.

In addition, each of the locations may encompass a discrete area, with GPS location information varying within each discrete area. For example, the first location 811a may be nominally located at 33.9864, −116.0156, in terms of decimal degrees latitude and longitude. In some embodiments, however, game play of the video game may be available with the game device within a predetermined range or distance of that location. For example, in some embodiments the game device may be considered to be located at the first location if the game device GPS location is anywhere between 33.9854 and 33.9874 latitude and −116.0146 and −116.0166 longitude. In such an area, a wide variation in seed numbers is possible, depending on how the seed number is generated using the GPS location information. Accordingly, in various embodiments a game device may be used in play of video games having dissimilar virtual game worlds at different separated areas, with selection of a one of the dissimilar virtual game worlds being based on GPS location information, with aspects of a game world for any one of the separated area dependent a seed number based on GPS location information for the game device within that area.

Figure 9:
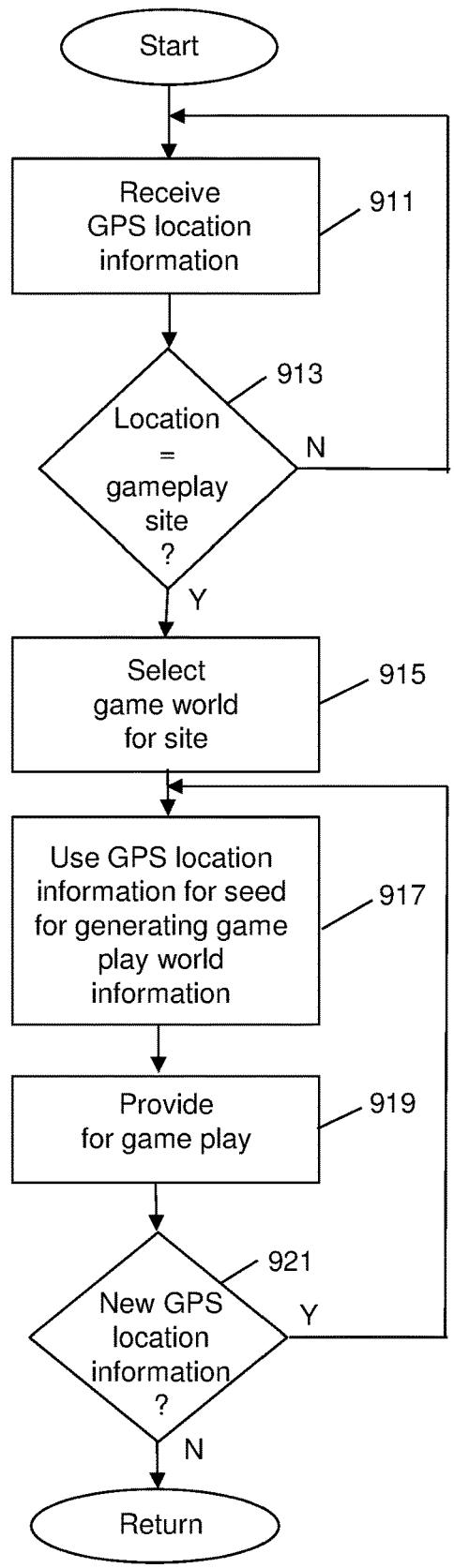
FIG. 9 is a flow diagram of a process for using GPS location information in a first manner for selecting a type of game world for game play and for using the GPS location information in a second manner for generating aspects of the game world, in accordance with aspects of the invention.

FIG. 9 is a flow diagram of a process for using GPS location information in a first manner for selecting a type of game world for game play and for using the GPS location information in a second manner for generating aspects of the game world, in accordance with aspects of the invention. In some embodiments the process is performed by a game device. In some embodiments the game device is a smart phone. In some embodiments the process, or parts of the process, is performed by a processor, for example a processor executing program instructions. The program instructions may be stored in non-transitory computer readable media available to the processor. In some embodiments the process is performed by a system, for example the system of FIG. 2. In some embodiments the process is performed by a part or parts of a system, for example a part or parts of the system of FIG. 2.

In block 911 the process receives GPS location information. In some embodiments the GPS location information is provided by GPS related circuitry of a game device. In some embodiments the GPS location information is received by a processor of a game device, or a portion of a processor of the game device. In some embodiments the GPS location information is received by a server. In some embodiments the GPS location information is in terms of latitude and longitude information. In some embodiments the latitude and longitude information is a latitude value and a longitude value. In some embodiments the latitude value and the longitude value are in a decimal degree format. In some embodiments the latitude value and the longitude value are in a degree decimal minute format. In some embodiments the latitude value and the longitude value are in some other format.

In block 913 the process determines if the GPS location information indicates game device presence at a game play site. In some embodiments the game play site is a predetermined area about a predetermined point in the physical world. In some embodiments the process determines that the GPS location information indicates game device presence at the game play site by comparing the GPS location information with corresponding location information for the game play site. In some embodiments the process determines that the GPS location information indicates game device presence at the game play site if the GPS location information is within a predetermined range of corresponding location information for the game play site. In some embodiments the process performs the comparison with respect to a plurality of game play sites, with the process determining if the GPS location information indicates game device presence at any of the game play sites, and, if so, which game play site.

If the process determines that the GPS location information does not indicate presence of the game device at a game site, the process returns to operations of block 911. If the process determines that the GPS location information indicates presence of the game device at a game site, the process continues to block 915.

In block 915 the process selects a game world for game play for the site of the game device, as indicated by the GPS location information. In some embodiments a type of game world for game play is predetermined, with the type of game world varying across at least some of the game play sites. In some embodiments the process selects a game world for game play for the site of the game device by referencing a table indicating different game worlds, or type of game worlds, for different game play sites.

In block 917 the process uses the GPS location information for determining a seed number for generating aspects of the game world. In some embodiments the process also uses the seed number in generating the aspects of the game world. In some embodiments the aspects of the game world include a layout of the game world. In some embodiments the aspects of the game world include non-player controlled characters in the game world, and/or their abilities and/or equipment and/or location. In some embodiments the aspects of the game world include presence and/or location of objects in the game world.

In block 919 the process provides for game play of the video game. In some embodiments providing game play comprises receiving inputs from input devices of the game device and controlling actions of a game icon or a game character associated with the game device's game player. In some embodiments the game character, responsive to commands provided by the input devices, is in and interacts with a virtual game world, including its objects and its other inhabitants, some of whom may be game characters controlled by other game players and some of whom may be non-player controlled game characters, for example controlled by the video game itself.

In some embodiments the process allows a game player to repopulate the aspects of the game world by moving the game device within an area defined as a game play site. Accordingly, in optional block 921 the process determines if the GPS location information indicates new GPS location information. If so, the process returns to operations of block 917, and regenerates the aspects of the game world. Otherwise the process returns.

Although the invention has been discussed with respect to various embodiments, it should be recognized that the invention comprises the novel and non-obvious claims supported by this disclosure.

What is claimed is:

1. A method for use in determining aspects of a virtual game world of a video game, comprising:
   receiving GPS location information generated by a game device including GPS related circuitry;
   forming a seed number using at least some of the GPS location information, wherein the seed number is different from the GPS location information; and
   procedurally generating aspects of the virtual game world using the seed number, the aspects being unrelated to GPS location.

2. The method of claim 1, wherein forming the seed number based on using at least some of the GPS location information comprises performing operations on information of latitude and/or longitude values of the GPS location information.

3. The method of claim 2, wherein the information of latitude and/or longitude values of the GPS location information consists of selected digits of the of latitude and/or longitude values of the GPS location information.

4. The method of claim 1, wherein the aspects of the virtual game world generated using the seed number comprise less than all of the aspects of the virtual game world.

5. The method of claim 4, wherein the aspects of the virtual game world comprise locations of objects in the virtual game world.

6. The method of claim 1, wherein the aspects of the virtual game world comprise features of a non-player controlled character in the virtual game world.

7. The method of claim 1, wherein the game device generates the aspects of the virtual game world using the seed number.

8. The method of claim 1, further comprising selecting the virtual game world based on the GPS location information, with aspects of the virtual game world separately being generated using the seed number.

9. The method of claim 8, wherein a server in communication with the game device selects the virtual game world based on the GPS location information and the game device generates aspects of the virtual game world using the seed number.

10. The method of claim 1, further comprising providing for play of the video game.

11. The method of claim 1, wherein the seed number does not provide information to identify the location indicated by the GPS location information.

12. The method of claim 1, wherein the procedurally generated aspects of the virtual game world do not include aspects related to position in the virtual game world.

13. The method of claim 1, wherein the procedurally generated aspects of the virtual game world comprise a puzzle.

14. A non-transitory computer readable memory storing program instructions, the program instructions comprising program instructions to configure at least one processor to:
   receive latitude and longitude values indicating location of a game device;
   operate on at least one of the latitude and longitude values to form a seed number, wherein the seem number is different from the latitude and longitude values; and
   use the seed number in procedurally generating aspects of a virtual game world for video game play, the aspects being unrelated to GPS location.

15. The non-transitory computer readable memory of claim 14, wherein the program instructions further comprise program instructions to provide for video game play.

16. The non-transitory computer readable memory of claim 14, wherein the aspects of the virtual game world comprise a map of the virtual game world.

17. The non-transitory computer readable memory of claim 14, wherein the aspects of the virtual game world comprise objects of the virtual game world.

18. The non-transitory computer readable memory of claim 14, wherein the aspects of the virtual game world comprise features of a non-player controlled game character.

19. The non-transitory computer readable memory of claim 14, wherein the seed number does not provide information to identify a location indicated by the latitude and longitude values indicating location of the game device.

20. The non-transitory computer readable memory of claim 14, wherein the procedurally generated aspects of the virtual game world do not include aspects related to position in the virtual game world.

21. The non-transitory computer readable memory of claim 14, wherein the procedurally generated aspects of the virtual game world comprise a puzzle.

* * * * *